R. PINDER.
FRICTION CLUTCH.
APPLICATION FILED FEB. 27, 1911.
1,007,310.
Patented Oct. 31, 1911.
3 SHEETS—SHEET 1.
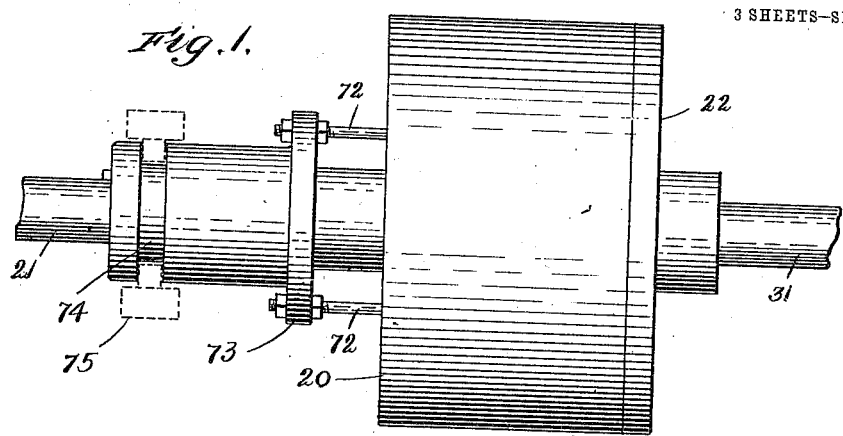
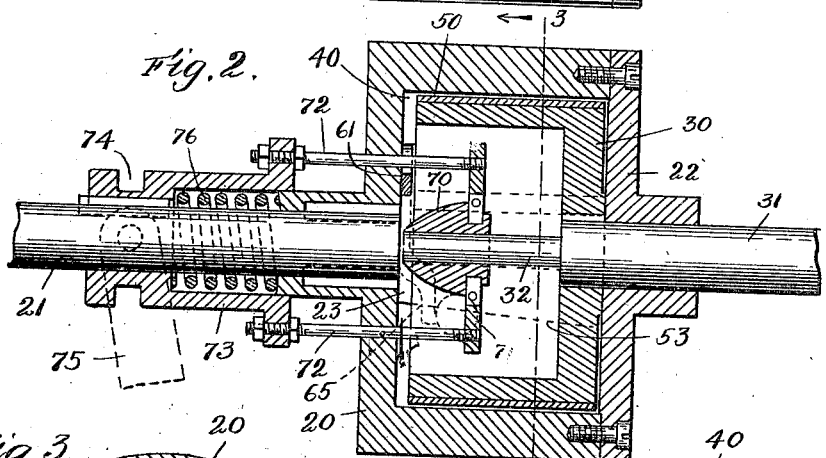
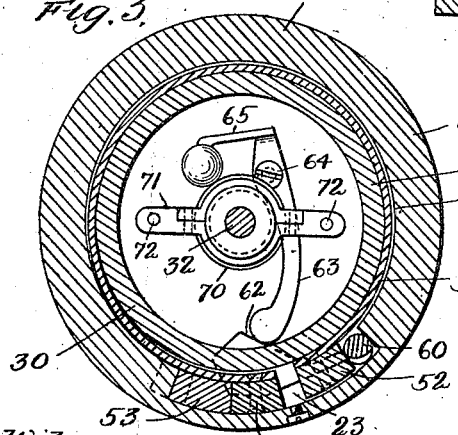
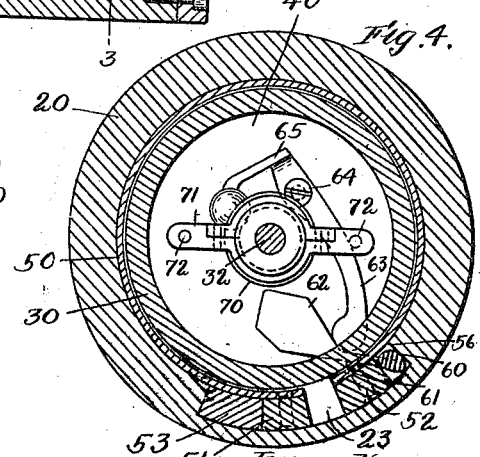
Witnesses:
H. B. Davis
G. H. Cushman
Inventor:
Rudolph Pinder
by Angus & Harriman
attys R. PINDER.
FRICTION CLUTCH.
APPLICATION FILED FEB. 27, 1911.
1,007,310.
Patented Oct. 31, 1911.
3 SHEETS—SHEET 2.
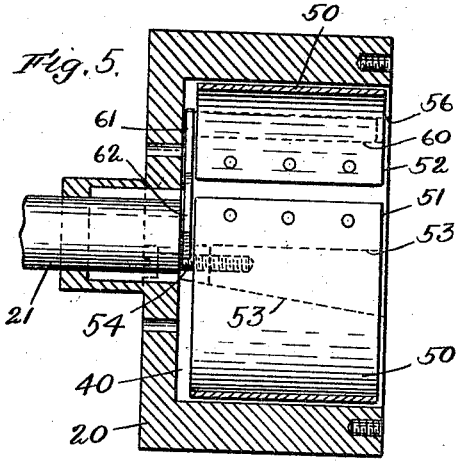
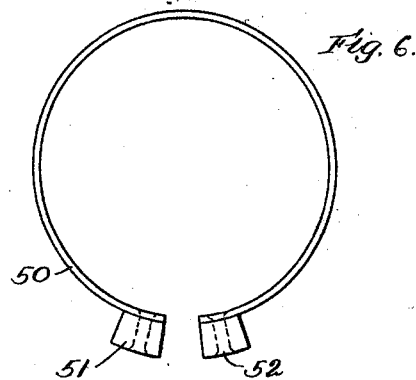
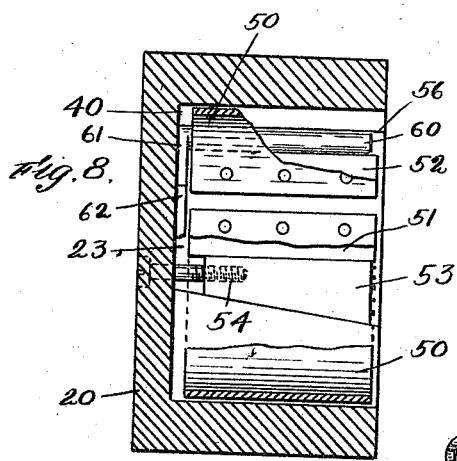
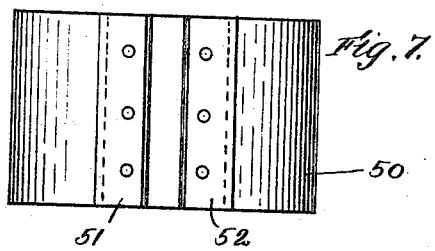
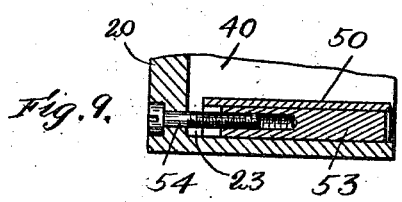
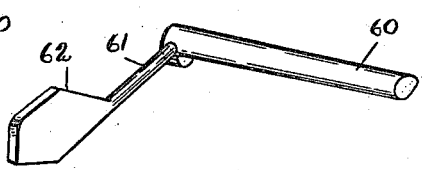
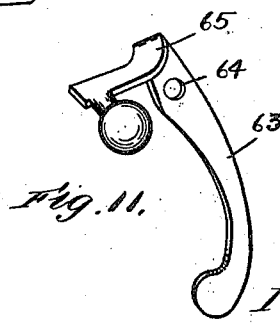
Witnesses:
H. B. Davis.
G. H. Cushman.
Inventor:
Rudolph Pinder
by Voyest Harriman
Attys.

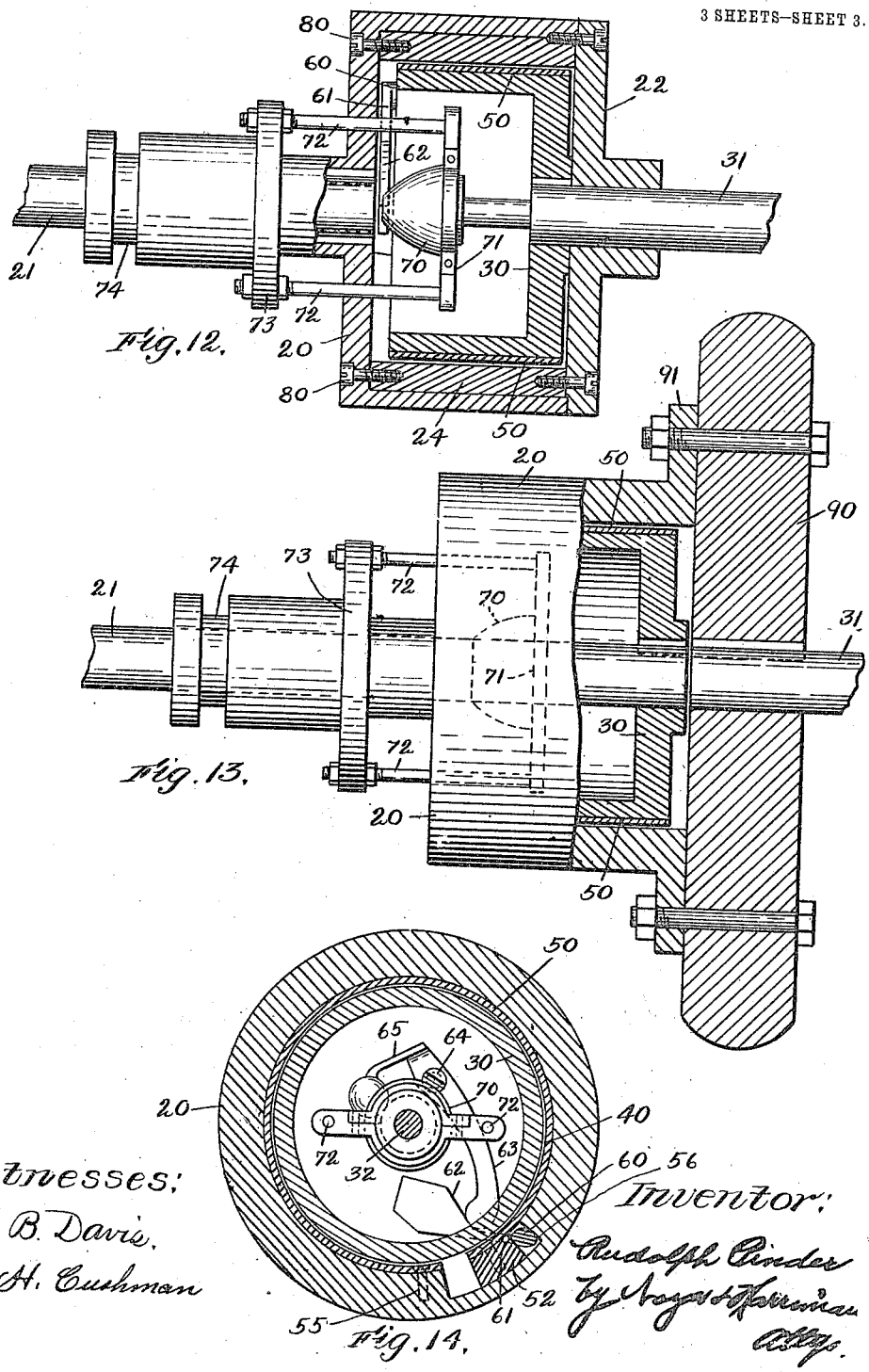

UNITED STATES PATENT OFFICE.

RUDOLPH PINDER, OF HUDSON, MASSACHUSETTS, ASSIGNOR OF ONE-HALF TO GEORGE W. PARKER, OF HUDSON, MASSACHUSETTS.

FRICTION-CLUTCH.

1,007,310.      Specification of Letters Patent.      Patented Oct. 31, 1911.

Application filed February 27, 1911. Serial No. 611,057.

*To all whom it may concern:*

Be it known that I, RUDOLPH PINDER, residing at Hudson, in the county of Middlesex and State of Massachusetts, have invented an Improvement in Friction-Clutches, of which the following is a specification.

This invention relates to friction clutches and is embodied in that type of clutch comprising two cylindrical, concentrically arranged members with an annular space between them, one serving as the driving-member and the other as the driven-member, and the invention has for its object certain improvements in the clutch-ring which is arranged in said annular space, and actuating-means therefor, whereby a very powerful clutch is produced which may be easily and quickly operated.

My invention consists essentially in a resilient split clutch-ring adapted to be arranged in said annular space, having an engaging surface approximately as large as the area of the cylindrical surface of the inner clutch-member which it is designed to engage, and having a normal tendency to expand, to disengage said inner clutch-member, one of its ends being held in fixed relation to the outer clutch-member and its other end being movable to contract the ring and cause it to engage said inner clutch-member.

As a means to move the end of the clutch-ring a cam-bar is employed, extending the full length of the ring, which is interposed between a lug on the end of the ring and an abutment on the outer member, and actuating means is provided to rock said cam-bar to move the end of the clutch-ring to cause said ring to engage the inner clutch-member. The actuating-means for said cam-bar involves two essential parts, which are disconnected from each other, one of which is connected with the cam-bar, and said parts are constructed and arranged to coöperate to rock the cam-bar, but are independently restored to normal, as for instance, the part connected with the cam-bar and the cam-bar itself are restored to normal by the expanding clutch-ring, when said ring is permitted to expand. This clutch is designed to run in a bath of oil.

Figure 1 is a plan view of a friction clutch embodying this invention. Fig. 2 is a longitudinal vertical section of the clutch shown in Fig. 1. Fig. 3 is a cross-section taken on the dotted line 3—3, Fig. 2, the clutch-ring being contracted. Fig. 4 is a similar cross-section, the clutch-ring being expanded. Fig. 5 is a sectional detail of the outer clutch-member, clutch-ring and cam-bar for contracting said clutch-ring. Fig. 6 is a plan view of the clutch-ring. Fig. 7 is a side elevation of the clutch-ring. Fig. 8 is a sectional detail of the outer clutch-member, clutch-ring and adjusting-device for holding one end of said clutch-ring in fixed relation to the outer-member. Fig. 9 is a sectional detail of the adjusting-device. Fig. 10 is a perspective view of the cam-bar. Fig. 11 is a perspective view of the actuating-lever for rocking the cam-bar. Figs. 12, 13 and 14 are modifications to be referred to.

20 represents one of the clutch-members and 30 the other clutch-member, and said clutch-members are cylindrical and are concentrically arranged with an annular space 40 between them. The inner clutch-member 30 consists of a hollow shell comprising a cylindrical portion and an end wall, and said member is secured to a shaft 31, which may be the driving-shaft and hence said member 30 will serve as the driving-member. Said member 30 has within it a center-spindle 32 upon which the actuating-means for the clutch-ring is slidably mounted. The outer clutch-member 20 consists of a hollow cylindrical case comprising a cylindrical portion and end walls at the opposite ends thereof to form a closed case. One of the end walls is splined, or otherwise secured to a shaft 21, which may be the driven shaft and is preferably formed integral with the cylindrial portion, hence said member 20 will serve as the driven member. The other end wall is made as a separate plate 22, adapted to be secured to the cylindrical portion and having a center-hole through it adapting it to be loosely mounted on the shaft 31. The cylindrical portion of said member 20 has an internal recess 23 extended longitudinally, approximately from end to end thereof, which is in open communication with the annular space 40. Said recess may be formed in the cylindrical portion of the case, by casting or otherwise, although, as shown in Fig. 12 a metallic ring 24 is made with an opening in its side to form said recess, and said ring is fitted into the cylindrical case and secured thereto. The clutch-ring 50 is arranged in said annular space 40. It consists of a resilient split band made to substantially encircle the inner clutch-member 30, and when contracted to engage said member. It has a normal tendency to expand, so that normally it entirely disengages said member. One end of said ring is designed to be held in fixed relation to the outer member; and in Figs. 3 to 9 it is adjustably held, and in Fig. 14 it is secured directly to the outer member. In Figs. 3 to 9 said clutch-ring has secured to its ends, respectively, outwardly projecting lugs 51, 52, which extend from side to side of the ring and which enter the recess 23 in the outer member. The lug 51 is held fixed with relation to said outer member, and, as here shown, a wedge-block 53 is placed between said lug 51 and one end wall of the recess 23, which fills the space between them, so that the lug bears against the wedge-block and the wedge-block bears against the end wall of the recess. The relative position of the lug may be varied by moving the wedge-block longitudinally, a result which may be accomplished by turning a screw 54, which extends through the wall of the outer member and enters a screw-threaded socket in the wedge-block. In Fig. 14 this end of the clutch-ring is secured directly to the outer member by a screw 55. The lug 52, at the other end of the ring is located a short distance from the end wall 56 of the recess 23, and in the space thus provided a cam-bar 60 is placed which extends from end to end of the lug, and is of such shape as to engage both the lug and the end wall of the recess, which latter forms an abutment 56 to be hereinafter referred to. Said cam-bar is adapted to be rocked to move the lug in a direction away from the abutment 56, and such movement results in contracing the ring to cause it to engage the inner clutch-member, and when permitted to return to normal said cam-bar is rocked in the opposite direction by the pressure upon it of the expanding ring. To rock the cam-bar to contract the ring any suitable means may be employed, so far as my present invention is concerned, but the means here shown is simple and effective.

Referring particularly to Figs. 3, 4, 10 and 11 the cam-bar is provided at one end with a short arm 61, which extends inward over the end of the inner clutch-member, thus occupying a position close to the inner face of the end wall of the outer clutch-member, and said arm has an inclined portion 62 adapted to be engaged by the end of a lever 63, pivoted at 64 to said end wall, the opposite end of said lever having an upwardly and outwardly extended portion 65, provided at its extremity with a spherical or other formed engaging portion. Pressure upon said spherical engaging portion acts to move the lever on its pivot to in turn move the arm 61 from the position shown in Fig. 4, to the position shown in Fig. 3, to thereby rock the cam-bar and contract the clutch-ring. When pressure upon said spherical end portion is relieved, the cam-bar is caused to return to normal position by pressure upon said bar of the expanding clutch-ring, and the lever is likewise returned to normal position. The resiliency of the clutch-ring normally keeps the portion 62 of the cam-bar in engagement with the lower end of the lever 63 and the spherical end of said lever in engagement with the cone to prevent rattling while the clutch is released. To move said lever a cone 70 is slidably mounted on the center-spindle 32 of the inner clutch-member, and the spherical engaging-portion of said lever occupies a position adjacent said cone, so as to be engaged by it. Said cone is connected to a cross-bar 71, and the extremities of said cross-bar are attached by rods 72, extended through the end wall of the outer clutch-member to a sliding collar 73, mounted on the shaft 21. Said collar has a circumferential groove 74, to receive the bifurcated end of a lever 75 of any suitable description, which is employed to control the sliding movement of the collar on the shaft in a direction to slide the cone 70 toward the left, Fig. 2, to engage the clutch, and said collar is thus moved along on the shaft, by means of a spring 76, which is arranged in the collar and encircles the shaft. The cone will thus be forced by the spring against the intermediate lever with a strong but yielding pressure to rock the cam-bar and contract the clutch-ring. The spring is under considerable compression, and by reason of the repeated vibrations of the parts it exerts an influence upon the cone tending to move it toward the left so that the intermediate lever is caused to gradually creep up farther on the cone. Thus there is a constant tendency for the clutch-ring to tighten. The collar is moved in the opposite direction, or toward the left, to correspondingly move the cone and release the clutch-ring, and during such movement of the collar the spring 76 is compressed.

By constructing the clutch-ring as here shown and providing a cam-bar for contracting it to engage the inner clutch-member a very powerful frictional engagement is produced, so that a clutch of small size may be employed to perform heavy duty.

In Fig. 12, wherein a lining ring 24, usually of a different metal from the cylindrical shell is employed, said ring will be secured to said shell by screws 80, or otherwise. The recess 23 may be provided by making the ring as an open or split ring, and an outer member of cheaper construction is thus produced.

In Figs. 1 to 12, the shaft 31 is usually the driving-shaft and the shaft 21 the driven-shaft, but my clutch is adapted to be used interchangeably, as for instance, it may be secured to a fly-wheel or equivalent rotatable member, as represented in Fig. 13, wherein 90 represents the fly-wheel, and the outer clutch-member 20 is formed with a flange 91 to permit of its attachment to said fly-wheel, and in such case the outer member becomes the driving-member and the inner member the driven-member, and said inner-member is secured to a shaft which in such case becomes the driven-shaft. It will thus be seen that my invention is susceptible of many modifications which come within its spirit and scope.

I claim:—

1. A friction-clutch comprising two cylindrical, concentrically arranged members with an annular space between them, one of said members comprising a closed casing, a resilient split clutch-ring arranged in said space having a normal tendency to expand, means to hold one end of said ring in fixed relation to the outer-member, a cam-bar interposed between the other end of said ring and the outer-member, which is extended lengthwise the ring, and means within said casing to rock said cam-bar to move the end of the ring to cause said ring to frictionally engage the inner-member, substantially as described.

2. A friction-clutch comprising two cylindrical, concentrically arranged members with an annular space between them, a resilient split clutch-ring arranged in said space having a normal tendency to expand, means to hold one end of said ring in fixed relation to the outer-member, a cam-bar interposed between the other end of said ring and the outer-member, which is extended lengthwise the ring, a lever which is disconnected from said cam-bar and means arranged to actuate said lever to cause it to rock said cam-bar to move the end of the ring to cause said ring to frictionally engage the inner-member, which permits said cam-bar to be restored to normal by the expanding ring, substantially as described.

3. A friction-clutch comprising two cylindrical, concentrically arranged members with an annular space between them, a resilient split clutch-ring arranged in said space having a normal tendency to expand, means to hold one end of said ring in fixed relation to the outer-member, a cam-bar interposed between the other end of the ring and the outer-member which is extended lengthwise said ring, an arm extended from said cam-bar, a lever arranged to engage said arm to rock the cam-bar, and means for moving said lever substantially as described.

4. A friction-clutch comprising two cylindrical, concentrically arranged members with an annular space between them, a resilient split clutch-ring arranged in said space having a normal tendency to expand, means to hold one end of said ring in fixed relation to the outer-member, a cam-bar interposed between the other end of the ring and the outer-member which is extended lengthwise said ring, an arm extended from said cam-bar, and independent means to engage said arm to rock the cam-bar, which is disconnected therefrom, to permit said cam-bar to be returned to normal independently thereof by the expanding ring, substantially as described.

5. A friction-clutch comprising two cylindrical, concentrically arranged members with an annular space between then, one of said members comprising a closed casing, a resilient split clutch-ring arranged in said space having a normal tendency to expand, means to hold one end of said ring in fixed relation to the outer member, a slidably mounted cone within said casing, means arranged within said casing and actuated by said cone to engage the other end of said ring to move it to contract the ring and cause the latter to frictionally engage the inner member, and means extended through the end wall of said casing to slide said cone.

6. A friction-clutch comprising two cylindrical, concentrically arranged members with an annular space between them and having center holes, a resilient split clutch-ring arranged in said space having a normal tendency to expand and engage the outer member, means to hold one end of said ring in fixed relation to the outer member, a cam to move the other end of said ring to contract the latter and cause it to engage the inner member, a center-spindle within the inner member, a cone slidably mounted on said spindle, an intermediate lever arranged between said cone and cam, and means to slide said cone on said spindle, substantially as described.

7. A friction-clutch comprising two cylindrical, concentrically arranged members with an annular space between them, a resilient split clutch-ring arranged in said space having a normal tendency to expand, means to hold one end of said ring in fixed relation to the outer member, spring-actuated means to engage the other end of said ring to move it to contract the ring and cause it to frictionally engage the inner member and controlling-means for said spring-actuated means, substantially as described.

8. A friction-clutch comprising two cylindrical, concentrically arranged members with an annular space between them, a resilient split clutch-ring arranged in said space having a normal tendency to expand, means to hold one end of said ring in fixed relation to the outer member, a cam-bar interposed between the other end of said ring and the outer member, an arm extended from said cam-bar, a lever arranged to engage said arm to rock the cam-bar, said cam-bar being returned to normal by the expanding ring to keep said arm in engagement with said lever and prevent rattling, substantially as described.

9. A friction-clutch, comprising two cylindrical, concentrically arranged members with an annular space between them, a resilient split clutch-ring arranged in said space having a normal tendency to expand, means to hold one end of said ring in fixed relation to the outer member, a slidably mounted cone, means operatively related to said cone to engage the other end of said ring, a spring for moving said cone to cause said ring to frictionally engage said inner member, and a lever for moving said cone in the opposite direction and for compressing said spring, substantially as described.

In testimony whereof, I have signed my name to this specification, in the presence of two subscribing witnesses.

RUDOLPH PINDER.

Witnesses:
  B. J. NOYES,
  H. B. DAVIS.